(12) United States Patent
Schudeleit et al.

(10) Patent No.: US 11,802,483 B2
(45) Date of Patent: Oct. 31, 2023

(54) COMBINED ADDITIVE AND SUBTRACTIVE MANUFACTURING OF BLADED ROTORS

(71) Applicant: TURBO SYSTEMS SWITZERLAND LTD., Baden (CH)

(72) Inventors: Timo Schudeleit, Dübendorf (CH); Ralf Hock, Dogern (DE)

(73) Assignee: Turbo Systems Switzerland LTD., Baden (CH)

(*) Notice: Subject to any disclaimer, the term of this patent is extended or adjusted under 35 U.S.C. 154(b) by 104 days.

(21) Appl. No.: 17/633,855

(22) PCT Filed: Jul. 29, 2020

(86) PCT No.: PCT/EP2020/071427
§ 371 (c)(1),
(2) Date: Feb. 8, 2022

(87) PCT Pub. No.: WO2021/028225
PCT Pub. Date: Feb. 18, 2021

(65) Prior Publication Data
US 2022/0364471 A1 Nov. 17, 2022

(30) Foreign Application Priority Data
Aug. 14, 2019 (EP) .................................... 19191739

(51) Int. Cl.
*F01D 5/14* (2006.01)
*F01D 5/34* (2006.01)
(Continued)

(52) U.S. Cl.
CPC ................ *F01D 5/147* (2013.01); *B22F 5/04* (2013.01); *B22F 10/66* (2021.01); *B22F 12/41* (2021.01);
(Continued)

(58) Field of Classification Search
CPC ............ F01D 5/147; F01D 5/34; B33Y 80/00; B33Y 40/20; B33Y 10/00; B22F 12/14;
(Continued)

(56) References Cited

U.S. PATENT DOCUMENTS

| 6,969,238 | B2 * | 11/2005 | Groh | B23K 20/129 |
| | | | | 415/216.1 |
| 9,950,388 | B2 * | 4/2018 | Chivers | B23K 26/342 |
| 10,180,072 | B2 * | 1/2019 | Roberts | F01D 5/066 |
| 10,376,960 | B2 * | 8/2019 | Sharon | B22F 7/06 |

(Continued)

FOREIGN PATENT DOCUMENTS

DE 102016120480 A1 5/2018

OTHER PUBLICATIONS

Extended European Search Report issued for European Application No. 19191739.2, dated Mar. 23, 2020, 11 pages.
(Continued)

*Primary Examiner* — Igor Kershteyn
(74) *Attorney, Agent, or Firm* — Armstrong Teasdale LLP

(57) ABSTRACT

Embodiments of bladed rotors and methods for manufacturing bladed rotors are provided herein. The method for manufacturing bladed rotors includes providing a workpiece including a first rotor blade segment. The first rotor blade segment includes a first platform portion on a radially outward end portion of the first rotor blade segment. Further, the method includes forming a second rotor blade segment, by additive manufacturing, removing a side portion of the first platform portion, and removing a side portion of the second rotor blade segment, whereby a second platform portion remains on a radially outward end portion of the second rotor blade segment.

20 Claims, 5 Drawing Sheets

(51) Int. Cl.
  *B33Y 10/00* (2015.01)
  *B33Y 80/00* (2015.01)
  *B33Y 40/20* (2020.01)
  *B22F 10/66* (2021.01)
  *B22F 12/41* (2021.01)
  *B22F 5/04* (2006.01)

(52) U.S. Cl.
  CPC ............... *B33Y 10/00* (2014.12); *B33Y 40/20* (2020.01); *B33Y 80/00* (2014.12); *F01D 5/34* (2013.01); *F05D 2230/10* (2013.01); *F05D 2230/31* (2013.01); *F05D 2240/80* (2013.01)

(58) Field of Classification Search
  CPC .. B22F 10/00; B22F 10/66; B22F 5/04; B22F 5/009; B22F 3/162; F05D 2230/30; F05D 2230/10; F05D 2230/31; F05D 2240/80
  See application file for complete search history.

(56) References Cited

U.S. PATENT DOCUMENTS

| | | | |
|---|---|---|---|
| 10,464,171 B2* | 11/2019 | Mohr | B33Y 80/00 |
| 10,493,694 B2* | 12/2019 | Takahashi | B29C 64/153 |
| 11,167,375 B2* | 11/2021 | Schiffres | B22F 10/28 |
| 2015/0360292 A1* | 12/2015 | Kountanya | B22F 10/38 |
| | | | 419/53 |
| 2016/0348517 A1* | 12/2016 | Kenyon | F04D 29/321 |
| 2019/0308285 A1* | 10/2019 | Dommermuth | B23P 15/006 |

OTHER PUBLICATIONS

International Search Report and Written Opinion issued for International Application No. PCT/EP2020/071427, dated Sep. 9, 2020, 15 pages.
Partial European Search Report issued in European Application No. 19191739.2, dated Jan. 29, 2020, 12 pages.

* cited by examiner

COMBINED ADDITIVE AND SUBTRACTIVE MANUFACTURING OF BLADED ROTORS

CROSS REFERENCE TO RELATED APPLICATIONS

The present application is a National Stage Entry of International Application No. PCT/EP2020/071427, filed on Jul. 29, 2020 which claims the benefit of priority to European Patent Application No. 19191739.2, filed on Aug. 14, 2019, the entire contents of which are incorporated by reference in their entirety herein.

BACKGROUND

Embodiments hereof relate to bladed rotors and to methods of producing bladed rotors.

Conventionally bladed rotors are manufactured by separately producing a hub or a disk, and a plurality of rotor blades. The blades are connected to the disk by means of form-fit joining, e.g. through a fir-tree profile.

The manufacturing of bladed rotors based on the aforementioned conventional method is cost-intensive, in particular the manufacturing of the form-fit joint on both the hub or disk and the blades is cost intensive and contributes to the major share of the entire bladed rotor costs.

An alternative method may be based on casting or moulding a workpiece and manufacturing the bladed rotor thereof in a subtractive manner, i.e. removing material from the workpiece by cutting or machining such that the rotor blades and the hub or disk remain. Another alternative method may be based on casting or moulding a workpiece containing the hub or disk and the rotor blades and subsequently removing material from the workpiece by cutting or machining.

Commonly, the rotor blades are arranged at a close distance from another, thus limiting the accessibility with subtractive manufacturing tools. Especially areas at the bottom of the blade, or in other words close to hub or disk, are either not accessible or only accessible with special tools. In the latter case, the special tools must have a high aspect ratio (which is referred to as ratio of tool length to tool diameter). These special tools with high aspect ratio are expensive compared to standard tools, and usually lead to poor manufacturing results due to vibration/chattering induced by cutting forces.

BRIEF DESCRIPTION

Briefly, a method of producing a bladed rotor, and a bladed rotor are provided to overcome at least some of the abovementioned limitations. This is accomplished by means of a method according to claim 1, and a bladed rotor according to claim 10.

According to an embodiment, a method for manufacturing a bladed rotor including a plurality of rotor blades is provided. The method includes the following sequence of steps:

A) Providing a workpiece including a first rotor blade segment. The first rotor blade segment includes a first platform portion on a radially outward end portion of the first rotor blade segment.

B1) Forming a second rotor blade segment, by additive manufacturing, radially outwardly on the first platform portion.

B2) Removing a side portion of the first platform portion, and removing a side portion of the second rotor blade segment, whereby a second platform portion remains on a radially outward end portion of the second rotor blade segment.

Optionally, the sequence of steps B1) and B2) may be repeated N≥1 times. Thereby, in the (n)th repetition, n=1 ... N, an (n+2)th rotor blade segment and an (n+2)th platform portion are formed and the side portion of the (n+1)th platform portion is removed, respectively. In case of no repetition of the steps B1) and B2), N=0.

The method further includes the steps:

C1) Forming, by additive manufacturing, an (N+3)th rotor blade segment radially outwardly on the (N+2)th platform portion.

C2) Removing a side portion of the (N+2)th platform portion, and removing a side portion of the (N+3)th rotor blade segment.

According to an embodiment, a bladed rotor is provided. The bladed rotor includes a hub and a plurality of rotor blades. Each rotor blade includes a plurality of rotor blade segments adjacent to each other. The rotor blade segments have respective bulk regions and interface regions arranged adjacent to radially outward end portions of the respective rotor blade segments. Further, the average grain size differs by at least 10%, and may differ by at least 20%, between the interface region and the bulk region of at least one of the rotor blade segments, and/or the average hardness differs by at least 5%, and may differ by at least 10%, between the interface region and the bulk region of at least one of the rotor blade segments.

Those skilled in the art will recognize additional features and advantages upon reading the following detailed description, and upon viewing the accompanying drawings.

BRIEF DESCRIPTION OF THE DRAWINGS

The components in the Figures are not necessarily to scale. Instead, emphasis is placed upon illustrating the principles of the present disclosure. Moreover, in the Figures, like reference signs designate corresponding parts. In the drawings.

DETAILED DESCRIPTION

Figure 1:
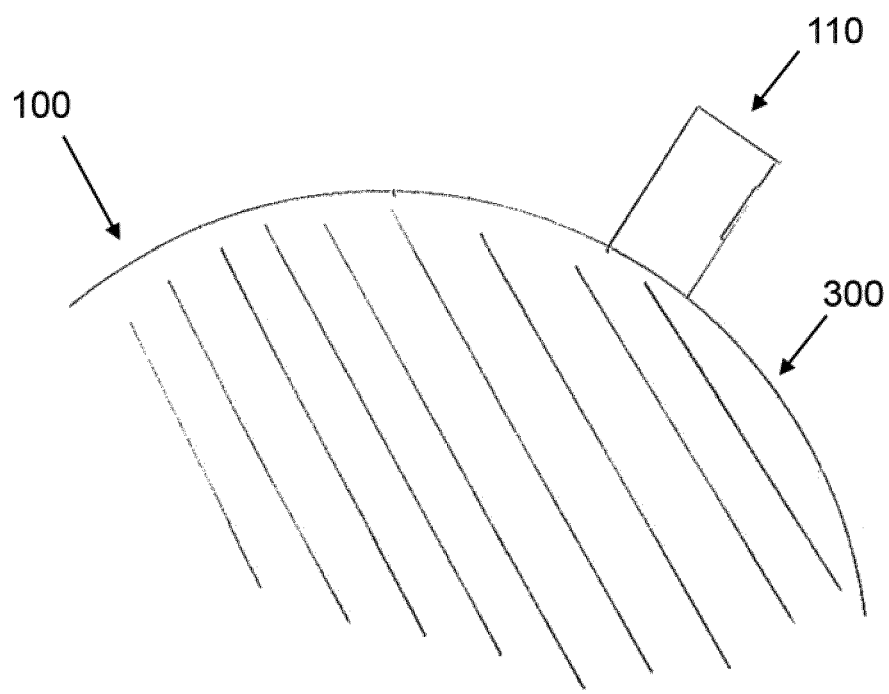
FIG. 1 displays a section of a bladed rotor according to an embodiment of the present disclosure.

In the following detailed description, reference is made to the accompanying drawings, which form a part hereof, and in which specific embodiments of the present disclosure are shown by way of illustration.

As used herein, the terms "having", "containing", "including", "comprising" and the like are open ended terms that indicate the presence of stated elements or features, but do not preclude additional elements or features.

It is to be understood that other embodiments may be utilised, and structural or logical changes may be made without departing from the scope of the present disclosure. The following detailed description, therefore, is not to be taken in a limiting sense, and the scope of the present disclosure is defined by the claims. The embodiments described herein use specific language, which should not be construed as limiting the scope of the claims.

According to an embodiment, a method for manufacturing a bladed rotor 100 is provided. The bladed rotor 100 includes a plurality of rotor blades 200, 201, 202, 203. Each of the rotor blades may include a plurality of rotor blade segments 110, 120.

Each rotor blade 200, 201, 202, 203 may define a build-up direction (or manufacturing direction). The build-up direction may essentially correspond to a radial direction of the bladed rotor 100. In some embodiments, the rotor blades 200, 201 may be curved. In this case, the build-up direction may be a combination of the radial direction and a lateral direction, perpendicular to the radial direction. Each of the rotor blade segments 110, 120, 130, 140 may be arranged adjacent to one or two other rotor blade segments in the build-up direction or in the radial direction of the bladed rotor 100. The (each) rotor blade segments may largely or fully span an entire cross-sectional area of the rotor blade 200, 201 transverse to the build-up direction or the radial direction. In other words, within a limited range of the radial direction or the build-up direction, the rotor blade 200, 201 may consist or essentially consist of one rotor blade segment 110, 120, 130, 140.

The lateral direction is be understood as being perpendicular to the radial direction and can include an axial direction of the bladed rotor 100. Side portions, as disclosed herein, refer to portions of components extending in the lateral direction.

The bladed rotor 100 may include a hub 300, 301. In particular, the hub 300, 301 may be disk shaped.

The bladed rotor 100 may be an axial turbine. The bladed rotor 100 may be a radial turbine. The bladed rotor 100 may be an exhaust turbine. The bladed rotor 100 may be a mixed flow turbine. The bladed rotor 100 may be a compressor.

The method includes the sequence of three steps: A, B and C.

Step A) of the method includes providing a workpiece 10. Step A) of the method may be regarded as providing or manufacturing of the innermost section of the bladed rotor 100. For example, FIGS. 2 and 5 display embodiments of the workpiece 10.

The workpiece 10 includes a first rotor blade segment 110. The first rotor blade segment 110 includes a first platform portion 111. The first platform portion 111 (and likewise all further platform portions 121, 131, 141 . . . as described further below) may include a side portion. Further the first platform portion 111 may include an inner portion. The inner portion may span a cross-sectional area substantially identical to a cross-sectional area of a portion of the first rotor blade segment 110 not including the first platform portion 111. The first platform portion 111 (and likewise all further platform portions 121, 131, 141 . . . as described further below) may be considered to a substantial degree as an auxiliary or temporary component for manufacturing purposes. At least portions, in particular the side portion, of the first platform portion 111 may not be contained in the bladed rotor 100 after the manufacturing is completed.

The first platform portion 111 is arranged on a radially outward end portion 114 of the first rotor blade segment 110. For example, FIGS. 2 and 5 display embodiments of the first platform portion 111 and the radially outward end portion 114 of the first rotor blade segment 110.

The side portion of the first platform portion 111 may extend less than 1 cm, or less than 2 mm, along a lateral direction, and may extend along all lateral directions. In one embodiment, the first rotor blade segment 110 including the side portion of the first platform portion 111 may extend up to 1 cm, or up to 4 mm, further along a lateral direction, and may extend along all lateral directions, compared to the first rotor blade segment 110 not including the first platform portion 111.

According to an embodiment, the side portion of the first platform portion 111 may partially, or entirely, surround a lateral circumference of the first rotor blade segment 110. The side portion of the first platform portion 111 may fully cover a radially outermost section of the first rotor blade segment 110. The aforementioned properties of the first platform portion 111 may similarly or equally apply to the further platform portions 121, 131, 141 . . . as described further below.

Forming of the workpiece 10 may include the step A1): providing a hub 300, 301. The workpiece 10 including the first rotor blade segment 110 may be formed in a number of different ways.

According to an embodiment, a step A2) may be carried out after step A1), A2) including removing a portion of the hub 301 to form the first rotor blade segment 110. In this embodiment, the radial dimension of the hub 300 of the bladed rotor 100 is reduced compared to the radial dimension of the hub 301 provided in step A1). Removing the portion of the hub 301 may be carried out such that the first platform portion 111 remains on the radially outward end portion 114 of the first rotor blade segment 110. Removing portions of components may also be referred to as subtractive manufacturing.

Figure 5:
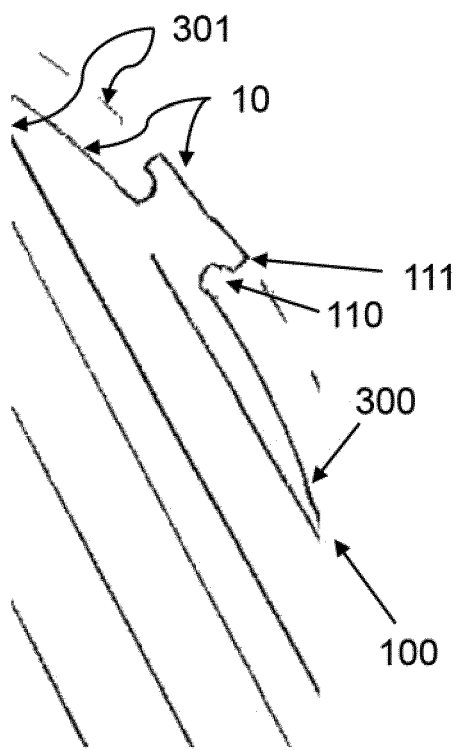
FIG. 5 displays a section of a bladed rotor according to an embodiment of the present disclosure.

FIG. 5 displays a section of the bladed rotor after step A2), i.e. after forming the workpiece 10. The dashed lines illustrate the hub 301 after step A1). The solid lines display the hub 300 along with the first rotor blade segment 110 after step A2).

According to another embodiment, a step A2') may be carried out after step A1), A2') including forming, by additive manufacturing, the first rotor blade segment 110 radially outwardly on the hub 300. Thereafter, a side portion of the first rotor blade segment 110 may be removed, whereby the first platform portion 111 remains on the radially outward end portion 114 of the first rotor blade segment 110. Removing the side portion of the first rotor blade segment 110 may be accompanied with removing a portion of the hub 300.

Figure 2:
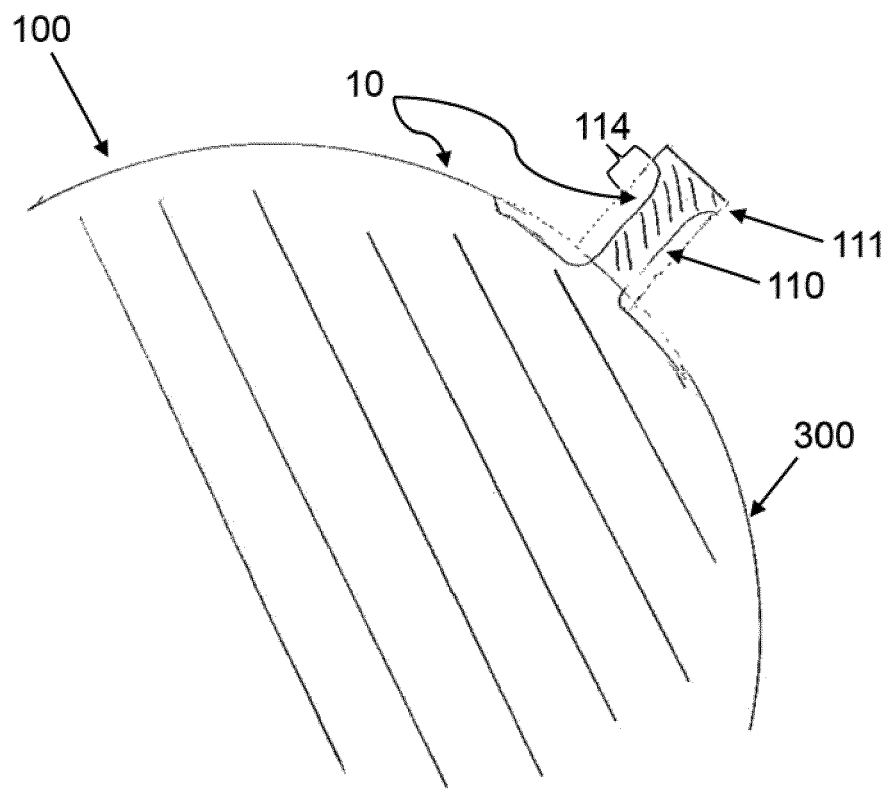
FIG. 2 displays a section of a bladed rotor according to an embodiment of the present disclosure.

FIG. 1 displays a section of the bladed rotor after a part of step A2') has been completed, i.e. after the first rotor blade segment 110 has been formed radially outwardly on the hub 300. FIG. 2 displays a section of the bladed rotor after completing step A2'), i.e. after forming the workpiece 10. The dotted lines illustrate the hub 300 and the first rotor blade segment 110 before removing portions.

The method for manufacturing a bladed rotor 100 further includes a step B). Step B) of the method may be regarded as manufacturing an intermediate section of the bladed rotor 100 or as manufacturing an intermediate section of the rotor blade 200.

Figure 3:
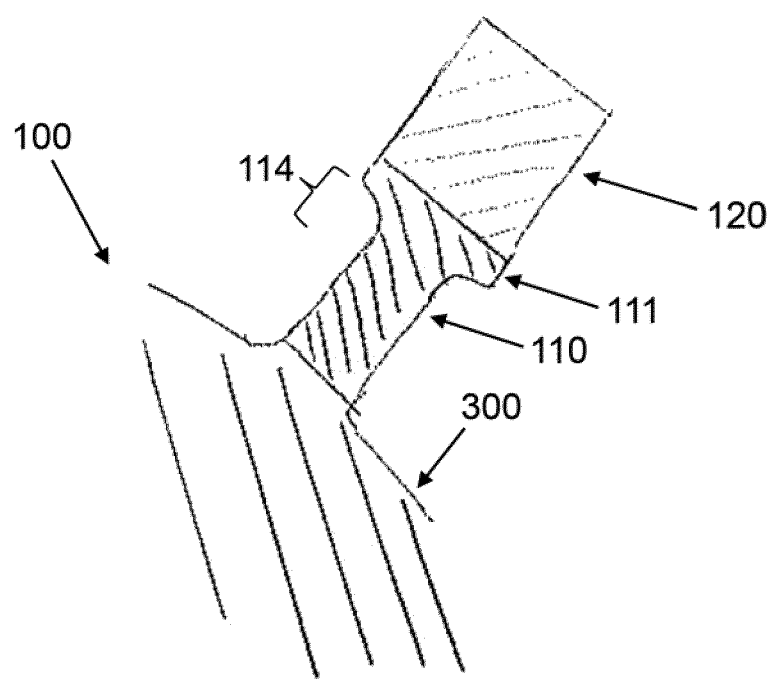
FIG. 3 displays a section of a bladed rotor according to an embodiment of the present disclosure.
Figure 6:
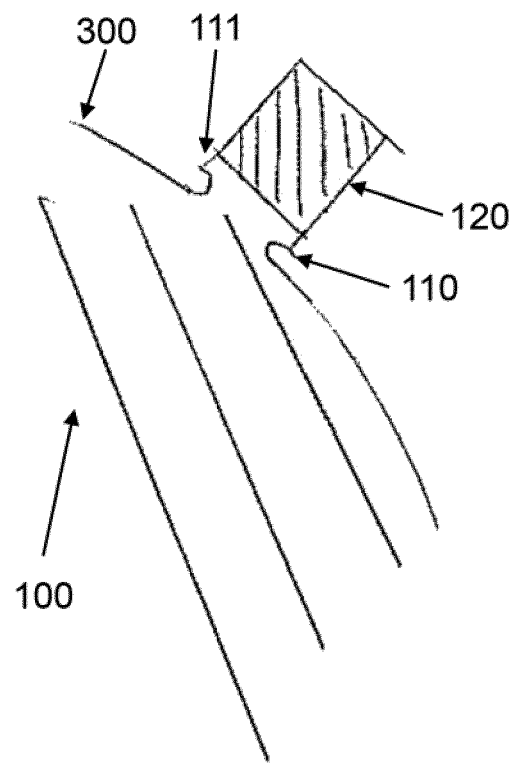
FIG. 6 displays a section of a bladed rotor according to an embodiment of the present disclosure.

Step B) includes the step B1) of forming, by additive manufacturing, a second rotor blade segment 120 radially outwardly on the first platform portion 111. For example, FIGS. 3 and 6 illustrate sections of the bladed rotor 100 after step B1) according to embodiments of the present disclosure.

Figure 4:
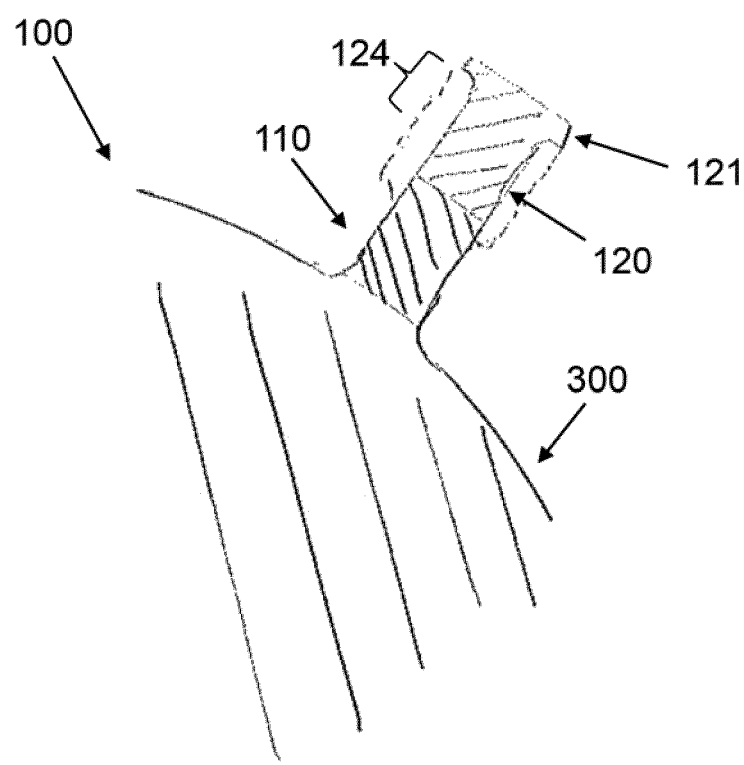
FIG. 4 displays a section of a bladed rotor according to an embodiment of the present disclosure.
Figure 7:
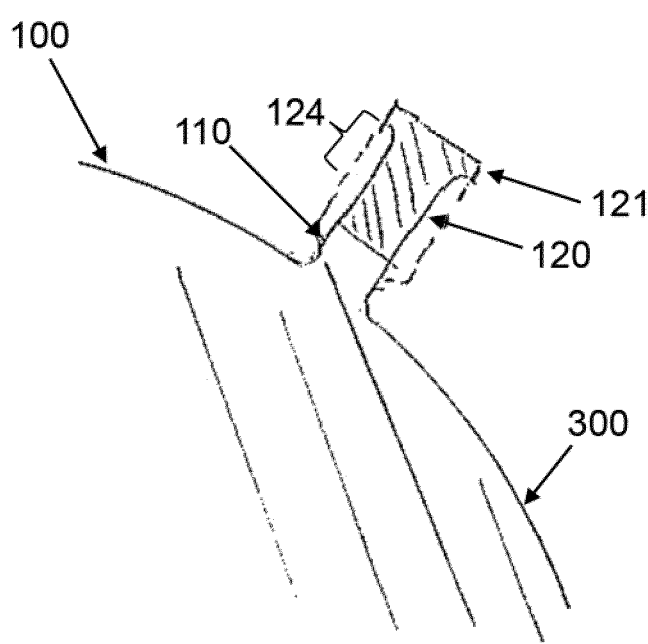
FIG. 7 displays a section of a bladed rotor according to an embodiment of the present disclosure.

In addition, step B) includes the step B2) of removing a side portion of the first platform portion 111 or removing substantially the entire first platform portion 111. The side portion of the first platform portion 111 may be removed such that no or essentially no parts of the first platform portion 111 protrude laterally compared to the remaining part of the first rotor blade segment 110 not including a first platform portion 111. Step B2) further includes removing a side portion of the second rotor blade segment 120. The side portion of the second rotor blade segment 120 may be removed such that a second platform portion 121 remains on a radially outward end portion 124 of the second rotor blade segment 120. For example, FIGS. 4 and 7 illustrate embodiments of sections of the bladed rotor 100 after step B2) according to embodiments of the present disclosure. The dashed lines illustrate portions of the first platform portion 111 and of the second rotor blade segment 120 that are removed in step B2).

According to an embodiment, the sequence of steps B1) and B2) may be repeated one or more times, i.e. N≥1 times. Thereby a third rotor blade segment 130, a fourth rotor blade segment 140, and so forth may be formed. Likewise, by repeating the sequence of steps B1) and B2), a third platform portion, a fourth platform portion, and so forth, are formed. Each additional (third, fourth, . . . ) rotor blade segment is formed radially outwardly on the previous (second, third, . . . ) platform portion, but in particular not on the first platform portion 111. In addition, the side portion of the second platform portion 121, a third platform portion, and so forth may be removed. Stated differently, by repeating the sequence of steps B1) and B2), in the (n)th repetition, n=1 . . . N, an (n+2)th rotor blade segment and an (n+2)th platform portion are formed and the side portion of the (n+1)th platform portion is removed, respectively. In case the sequence of steps B1) and B2) is not repeated, N=0.

The sequence of steps B1) and B2) may be repeated any number of times. According to one exemplary embodiment, the sequence of steps B1) and B2) is repeated once. According to another exemplary embodiment, the sequence of steps B1) and B2) is repeated nine times.

The method for manufacturing a bladed rotor 100 further includes a step C). Step C) of the method may be regarded as manufacturing an outer section, in particular a final or outermost section, of the bladed rotor 100 or as manufacturing an outer section, in particular a final or outermost section, of the rotor blade 200.

Step C) includes the step C1) of forming, by additive manufacturing, an (N+3)th rotor blade segment radially outwardly on the (N+2)th platform portion. According to an embodiment, step C1) is carried out in a manner essentially analogous to step B1). In one embodiment, the (N+2)th platform portion may be regarded as a penultimate platform portion, and the (N+3)th rotor blade segment may be regarded as a final rotor blade segment.

In addition, step C) includes the step C2) of removing a side portion of the (N+2)th platform portion. The side portions of the (N+2)th platform portion may be removed such that no or essentially no parts of the (N+2)th platform portion protrude laterally compared to the remaining part of the (N+2)th rotor blade segment not including a (N+2)th platform portion. Step C2) may further include removing a side portion of the (N+3)th rotor blade segment. In an embodiment, the side portion of the (N+3)th rotor blade segment may be removed such that no ((N+3)th) platform portion remains on a radially outward end portion of the (N+3)th rotor blade segment. The side portion of the (N+3)th rotor blade segment may be removed such that no or essentially no parts of the (N+3)th rotor blade segment protrude laterally compared to the (N+2)th rotor blade segment.

Removal of portions of the hub 301 and/or the first or further rotor blade segments 110, 120, . . . and/or the first or further platform portions 111, 121, . . . may be carried out by means of machining, wherein the machining may include rough milling and finish milling.

Additive manufacturing as such is known to the skilled person. For example, standard terminology for additive manufacturing technologies is disclosed in ASTM F2792-12a.

The additive manufacturing may include providing a build material. The build material may be one of a powder and wire. According to an embodiment, the build material may include an alloy containing nickel (e.g. at least 50 wt % nickel), in particular a nickel-based alloy. In addition or alternatively, the hub 300, 301 may include an alloy containing nickel (e.g. at least 50 wt % nickel), in particular a nickel-based alloy. For example, the build material may include alloy NiCr22Mo9Nb (also referred to as alloy 625, 2.4856) and/or alloy NiCr19NbMo (also referred to as alloy 718, 2.4668). For example, the hub 300, 301 may include alloy NiCr22Mo9Nb (also referred to as alloy 625, 2.4856) and/or alloy NiCr19NbMo (alloy 718, 2.4668) and/or alloy NiCrAlMoTiNbZr (also referred to as alloy 713LC, UNS N07713) and/or alloy NiFeCr12Mo (also referred to as alloy 901, 2.4975). According to an embodiment, the build material may include an alloy containing iron (e.g. at least 50 wt % iron), in particular an iron-based alloy. In addition or alternatively, the hub 300, 301 may include an alloy containing iron (e.g. at least 50 wt % iron), in particular an iron-based alloy. In an embodiment, the build material and the hub 300, 301 may include the same alloy.

The additive manufacturing may include fusing the build material by means of focused thermal energy. The focused thermal energy may be selected from the group consisting of a laser beam, an electron beam, an electric arc and a plasma arc. The focused thermal energy may be a laser beam. In case the focused thermal energy is an electric arc, the build material may be a wire.

The method for manufacturing bladed rotors 100 according to embodiments of the present disclosure is advantageous for numerous reasons. The manufacturing of the bladed rotor 100 does not require manufacturing form-fit joints and does not require building or attaching the rotor blades to the hub or disk with form-fit joints. Advantageously, the method according to embodiments of the present disclosure enables producing bladed rotors at lower costs. The production costs may be lowered by up to 30%. The rotor blades 200, 201 are fused to the hub 300, 301 by means of the focused thermal energy, thus resulting in a more robust bladed rotor 100, which may be less prone to fracturing or breaking compared to bladed rotors including form-fit joints.

Further, manufacturing the rotor blades in a number of consecutive steps, and in particular removing side portions of each rotor blade segment before the subsequent rotor blade segment is formed, enables access to sections of the rotor blades that cannot be accessed later on. (For example, once all segments of the rotor blade have been formed, with low cost or standard tools.) Advantageously, special and/or costly tools having a high aspect ratio are not required to manufacture bladed rotors 100 according to embodiments of the present disclosure. In many applications, it is suitable or desired to manufacture rotor blades including build materials with inferior machinability, in particular numerous nickel-based alloys. By manufacturing the rotor blades in a number of consecutive steps, and in particular by removing side portions of each rotor blade segment individually, the inferior machinability, which some build materials have, is a considerably more minor issue.

Advantageously, subtractively forming (removing side portions of) the rotor blade segments such that a platform portion remains on the rotor blade segment before the subsequent rotor blade segment is additively manufactured avoids inaccuracies. The platform portions protect or shield the antecedent rotor blade segments from weld spatters caused by the focused thermal energy and the build material, which negatively impact the surface quality of the rotor blades 200 and/or the hub 300. Further, the focused thermal energy leads to a heat-impacted zone on the antecedent rotor blade segment. The heat-impacted zone can lead to thermal distortion and therefore inaccuracies. The platform portion serves as a support and locally separates the antecedent rotor blade segment from the heat-impacted zone or in other words, heat is largely distributed throughout the entire platform portion, thus avoiding thermal distortion to the antecedent rotor blade segment. Further, subtractively forming (removing side portions of) the rotor blade segments such that a platform portion remains on the rotor blade segment before the subsequent rotor blade segment is additively manufactured advantageously facilitates the manufacturing of transitions between "twisted" sections of a rotor blade, i.e. in case the build-up direction is a combination of the radial direction and the lateral direction (not fully straight throughout its radial extent). In particular, the surface quality of the transition region between successive rotor blade segments may be improved in case of "twisted" sections by enabling a smooth transition region.

The present disclosure relates to methods for manufacturing the bladed rotor 100 including a plurality of rotor blades 200. The embodiments above concern the sequence of steps for manufacturing one rotor blade. The sequence of steps to manufacture a first rotor blade 200 compared to the sequence of steps to manufacture a second rotor blade 201 may be carried out in any order.

Figure 8:
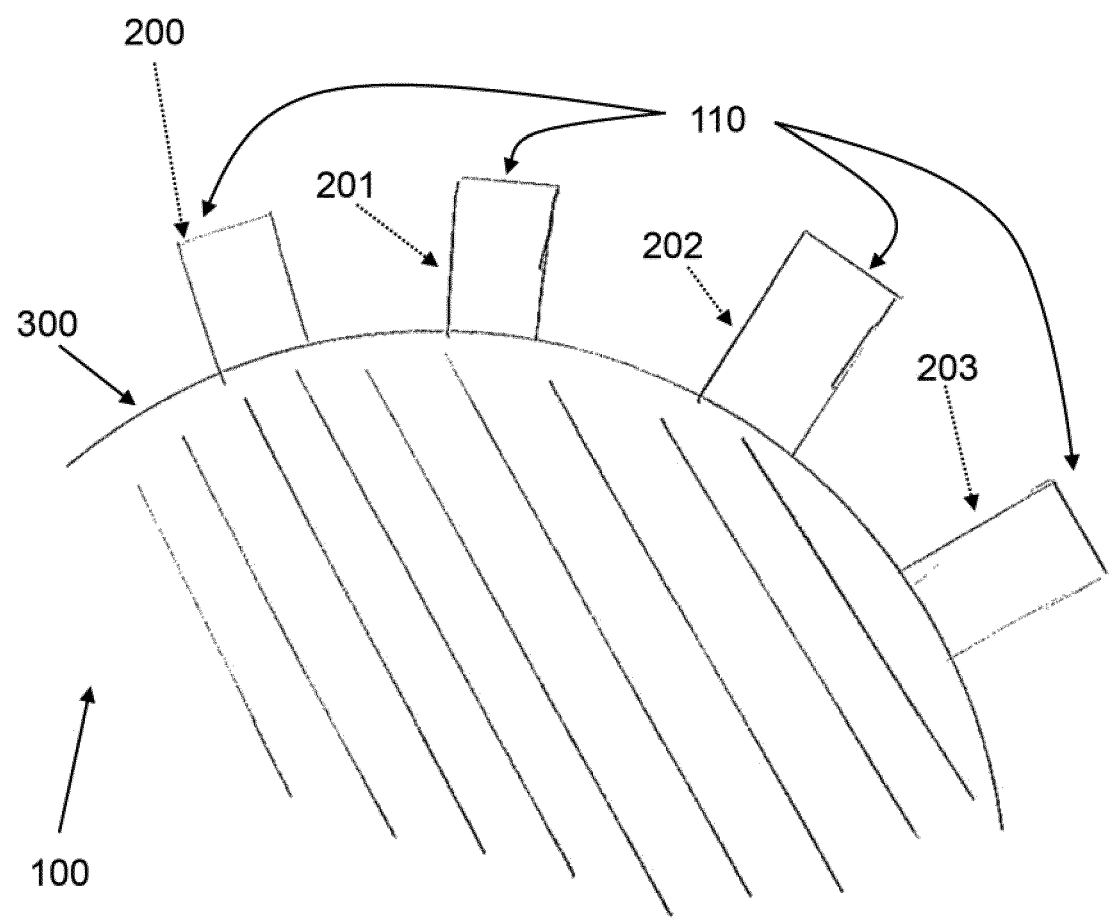
FIG. 8 displays a section of a bladed rotor according to an embodiment of the present disclosure.

According to one embodiment, the method may further include that one, or, of the steps selected from A2), A2'), B1), B2), C1), C2) are carried out for all rotor blades 200 before carrying out a successive step. For example, the step A2') may be carried out for all rotor blades 200, 201 before carrying out a step B1) for all rotor blades 200, 201. FIG. 8 illustrates a section of a bladed rotor 100 according to an embodiment of the present disclosure, wherein the first rotor blade segments 110 are formed for all rotor blades 200, 201, 202, 203 (FIG. 8 illustrates a section of the bladed rotor 100, and thus illustrates only portions of some of the rotor blades) before step B1) is carried out. Parts of one, or even all, of the steps selected from A2), A2'), B1), B2), C1), C2) may also be carried out for all rotor blades 200 before carrying out a successive part of a step. FIG. 8 illustrates an embodiment, wherein the first rotor blade segments (110) are formed for all rotor blades 200, 201, 202, 203 before side portions of the first rotor blade segments 110 are removed.

In an embodiment, the method may further include that all of the manufacturing steps selected from A2), A2'), B1), B2), C1) and C2) are carried out for a first rotor blade 200, before any of the manufacturing steps selected from A2), A2'), B1), B2), C1) and C2) are carried out for a second rotor blade 201. The first rotor blade 200 may even be fully formed before carrying out any of the manufacturing steps for forming the second rotor blade 201.

According to an embodiment, a method for manufacturing a turbocharger including a bladed rotor (100) is provided. The bladed rotor (100) includes a plurality of rotor blades and is manufactured according to any one of the embodiments disclosed herein.

According to an embodiment, a bladed rotor 100 is provided. The bladed rotor 100 may include a hub 300 and a plurality of rotor blades 200, 201, 202, 203. Each rotor blade 200 may include a plurality of rotor blade segments 110, 120, 130, 140 adjacent to each other.

Each of the rotor blade segments 110, 120, 130, 140 may have respective bulk regions 112, 122, 132, 142. Further, each of the rotor blade segments 110, 120, 130, 140 may include interface regions 113, 123, 133, 143 arranged adjacent to radially outward end portions 114, 124, 134 of the respective rotor blade segments 110, 120, 130, 140. The interface regions 113, 123, 133, 143 may be arranged adjacent to the bulk region 112, 122, 132, 142 of the same rotor blade segment 110, 120, 130, 140 and adjacent to the bulk region 112, 122, 132, 142 of the adjacent rotor blade segment 110, 120, 130, 140.

Figure 9:
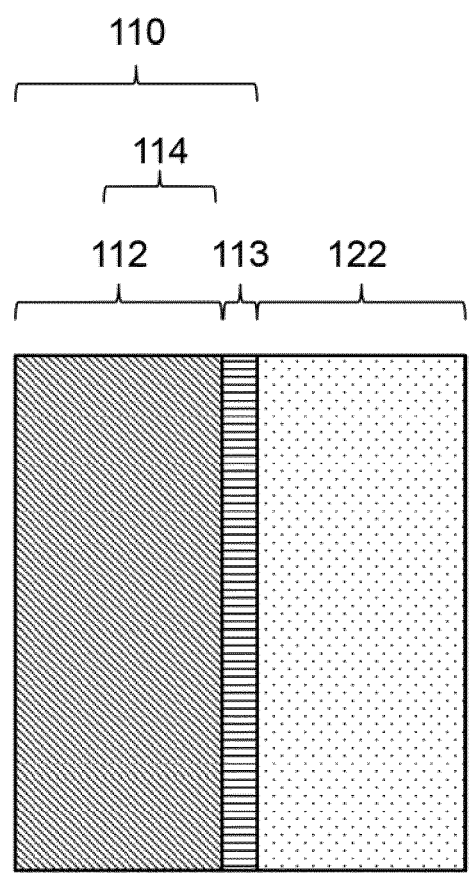
FIG. 9 displays a section of a rotor blade according to an embodiment of the present disclosure.

For example, FIG. 9 illustrates a section of a rotor blade 200, including an interface region 113 arranged adjacent to the radially outward end portion 114 of the first rotor blade segment 110. The interface region 113 is arranged adjacent to the first bulk region 112 of the first rotor blade segment 110 and adjacent to the second bulk region 122 of the second rotor blade segment 120.

The interface regions 113, 123, 133, 143 may extend less than 1 mm in the radial direction, or less than 200 µm in the radial direction.

The bladed rotor 100, according to embodiments of the present disclosure, differs from known bladed rotors 100, in particular by the attachment or mounting of the rotor blades 200 to the hub 300, 301 and/or by properties of the rotor blades 200. The rotor blades 200 of the bladed rotor 100 according to the present disclosure may have at least one property that differs between the interface region 113, 123, 133, 143 and the bulk region 112, 122, 132, 142 of at least one of the rotor blade segments 110, 120, 130, 140.

According to an embodiment, the bladed rotor 100 is provided as an integral piece. In particular, the bladed rotor 100 is provided without any form-fit joints between the hub 300 and the rotor blades 200.

In one embodiment, an average grain size differs by at least 10%, and may differ by at least 20%, between the interface region 113, 123, 133 and the bulk region 112, 122, 132 of at least one of the rotor blade segments 110, 120, 130. The average grain sizes are determined according to ASTM E112-13 Section 11 (Planimetric or Jeffries' (3) Procedure). The average grain size may be at least 10%, and may be at least 20%, lower in the interface region 113, 123, 133 compared to the bulk region 112, 122, 132, 142 of at least one of the rotor blade segments 110, 120, 130, 140.

In one embodiment, an average hardness differs by at least 5%, and may differ by at least 10%, between the interface region 113, 123, 133 and the bulk region 112, 122, 132, 142 of at least one of the rotor blade segments 110, 120, 130, 140. Methods for determining the hardness and the average hardness are known to the skilled person. The average hardness may be determined according to DIN EN ISO 6507. The average hardness may be determined by recording a micrograph, and selecting an area, for example by inscribing a circle or rectangle, with a predetermined size (e.g. 5000 mm$^2$). The average hardness may be at least 5%, and may be at least 10%, greater in the interface region 113, 123, 133 compared to the bulk region 112, 122, 132 of at least one of the rotor blade segments 110, 120, 130.

The properties of the respective interface regions 113, 123, 133 may be a result of the advantageous manufacturing method and/or of subjecting the interface regions 113, 123, 133 to heat resulting from the focused thermal energy during the manufacturing process in at least two respective method steps. The bladed rotor 100 is obtained by additive manufacturing. The bladed rotor 100 may be manufactured according to any one of the embodiments disclosed herein.

The bladed rotor 100 may be an axial turbine or a radial turbine. The bladed rotor 100 may be an exhaust turbine. The bladed rotor 100 may be a mixed flow turbine. The bladed rotor 100 may be a compressor. According to an embodiment, a turbocharger is provided. The turbocharger includes a bladed rotor (100) according to any one of the embodiments disclosed herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "100 μm" is intended to mean "about 100 μm".

The invention claimed is:

1. A method for manufacturing a bladed rotor comprising a plurality of rotor blades, the method comprising the following sequence of steps:
   A) providing a workpiece comprising a first rotor blade segment, wherein the first rotor blade segment comprises a first platform portion on a radially outward end portion of the first rotor blade segment;
   B1) forming, by additive manufacturing, a second rotor blade segment radially outwardly on the first platform portion;
   B2) removing a side portion of the first platform portion, and removing a side portion of the second rotor blade segment, wherein a second platform portion remains on a radially outward end portion of the second rotor blade segment, wherein a sequence of steps B1) and B2) is repeated N times, and wherein N=0 in case of no repetition of the steps B1) and B2);
   C1) forming, by additive manufacturing, an (N+3)th rotor blade segment radially outwardly on an (N+2)th platform portion; and
   C2) removing a side portion of the (N+2)th platform portion, and removing a side portion of the (N+3)th rotor blade segment.

2. The method according to claim 1, wherein providing the workpiece in step A) comprises:
   A1) providing a hub; and performing one of:
   A2) removing a portion of the hub to form the first rotor blade segment; and
   A2') forming, by additive manufacturing, the first rotor blade segment radially outwardly on the hub, and subsequently removing a side portion of the first rotor blade segment, wherein the first platform portion remains on the radially outward end portion of the first rotor blade segment.

3. The method according to claim 1, wherein the side portion of the first platform portion extends less than 1 cm along a lateral direction.

4. The method according to claim 1, wherein the side portion of the first platform portion at least partially surrounds a lateral circumference of the first rotor blade segment.

5. The method according to claim 1, wherein the additive manufacturing comprises providing a build material and fusing the build material by using focused thermal energy.

6. The method according to claim 5, wherein the focused thermal energy is one of a laser beam, an electron beam, an electric arc, and a plasma arc.

7. The method according to claim 5, wherein the build material comprises an alloy containing nickel and/or iron.

8. The method according to claim 2, wherein one of the steps selected from A), A2) or A2'), B1), B2), C1), and C2) is carried out for the plurality of rotor blades before carrying out a successive step.

9. The method according to claim 2, wherein the steps A), A2) or A2'), B1), B2), C1), and C2) are carried out for a first rotor blade, and thereafter the steps A), A2) or A2'), B1), B2), C1), and C2) are carried out for a second rotor blade.

10. The method according to claim 2, wherein removal of portions of the hub and/or the first rotor blade segment or further rotor blade segments and/or the first platform portion or further platform portions may be carried out by machining.

11. The method according to claim 1, wherein the bladed rotor further comprises:
   a hub, wherein each rotor blade comprises a plurality of rotor blade segments adjacent to each other, the rotor blade segments having respective bulk regions and interface regions arranged adjacent to radially outward end portions of respective rotor blade segments, wherein an average grain size differs by at least 10% between the interface region and the bulk region of at least one of the rotor blade segments, and/or wherein an average hardness differs by at least 5% between the interface region and the bulk region of at least one of the rotor blade segments.

12. The method according to claim 1, wherein the sequence of steps B1) and B2) is repeated N≥1 times, and wherein in the (n)th repetition, n=1 . . . N, an (n+2)th rotor blade segment and an (n+2)th platform portion are formed and the side portion of the (n+1)th platform portion is removed, respectively.

13. The method according to claim 3, wherein the side portion of the first platform portion extends less than 2 mm along the lateral direction.

14. The method of claim 6, wherein the focused thermal energy is the laser beam.

15. The method according to claim 1, wherein one of the steps selected from A), B1), B2), C1), and C2) is carried out for the plurality of rotor blades before carrying out a successive step.

16. The method according to claim 1, wherein the steps A), B1), B2), C1), and C2) are carried out for a first rotor blade, and thereafter the steps A), B1), B2), C1), and C2) are carried out for a second rotor blade.

17. A bladed rotor, comprising a hub and a plurality of rotor blades, wherein each rotor blade comprises a plurality of rotor blade segments adjacent to each other, the rotor blade segments having respective bulk regions and interface regions arranged adjacent to radially outward end portions of respective rotor blade segments, wherein an average grain size differs by at least 10% between the interface region and the bulk region of at least one of the rotor blade segments, and/or wherein an average hardness differs by at least 5% between the interface region and the bulk region of at least one of the rotor blade segments.

18. The bladed rotor of claim 17, wherein the bladed rotor is provided as an integral piece.

19. The bladed rotor of claim 17, wherein the bladed rotor is obtained by additive manufacturing.

20. The bladed rotor of claim 11, wherein the average grain size differs by at least 20% between the interface region and the bulk region of at least one of the rotor blade segments, and/or wherein the average hardness differs by at least 10% between the interface region and the bulk region of at least one of the rotor blade segments.

* * * * *